United States Patent
Ragupathi et al.

(10) Patent No.: US 10,505,843 B2
(45) Date of Patent: Dec. 10, 2019

(54) SYSTEM AND METHOD FOR OPTIMIZING MANAGEMENT CONTROLLER ACCESS FOR MULTI-SERVER MANAGEMENT

(71) Applicant: Dell Products, LP, Round Rock, TX (US)

(72) Inventors: Dinesh K. Ragupathi, Round Rock, TX (US); Yogesh P. Kulkarni, Round Rock, TX (US); Wade A. Butcher, Cedar Park, TX (US); Hendrich M. Hernandez, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 545 days.

(21) Appl. No.: 14/656,058

(22) Filed: Mar. 12, 2015

(65) Prior Publication Data

US 2016/0269283 A1    Sep. 15, 2016

(51) Int. Cl.
*H04L 12/741*    (2013.01)
*H04L 29/12*    (2006.01)

(52) U.S. Cl.
CPC .......... *H04L 45/54* (2013.01); *H04L 61/2007* (2013.01); *H04L 61/2514* (2013.01)

(58) Field of Classification Search
None
See application file for complete search history.

(56) References Cited

U.S. PATENT DOCUMENTS

| | | | | |
|---|---|---|---|---|
| 5,072,217 A | * | 12/1991 | Georgiou | H04Q 3/521 340/2.25 |
| 5,966,659 A | * | 10/1999 | McDonald | H04W 84/08 455/11.1 |
| 6,529,951 B1 | * | 3/2003 | Okuyama | H04L 12/40013 370/257 |
| 7,349,980 B1 | * | 3/2008 | Darugar | G06F 17/3089 709/211 |
| 2002/0055980 A1 | * | 5/2002 | Goddard | H04L 29/06 709/217 |
| 2004/0230830 A1 | * | 11/2004 | Ogawa | H04L 63/0281 726/11 |

(Continued)

OTHER PUBLICATIONS

"The Address plus Port (A+P) Approach to the IPv4 Address Shortage," R. Bush, Ed., Internet Engineering Task Force (IETF), Request for Comments; RFC 6346, ISSN: 2070-1721, Aug. 2011, pp. 1-38.

(Continued)

*Primary Examiner* — Clayton R Williams
*Assistant Examiner* — Tania M Pena-Santana
(74) *Attorney, Agent, or Firm* — Larson Newman, LLP (57) ABSTRACT

An information handling system includes a memory and a first controller. The memory stores a mapping table. The first controller is configured to communicate with the memory. The first controller detects a presence of a second controller in response to a first node being connected to a network within the information handling system, generates a port number for the second controller, stores the port number for the second controller in the mapping table, receives an indication that an Internet Protocol address of the second controller has changed, and updates the mapping table with the changed Internet Protocol address of the second controller.

20 Claims, 5 Drawing Sheets

(56) References Cited

U.S. PATENT DOCUMENTS

| | | | | |
|---|---|---|---|---|
| 2008/0168209 | A1* | 7/2008 | Davison | G06F 3/0605 |
| | | | | 711/6 |
| 2010/0082812 | A1* | 4/2010 | Brady | H04L 41/0806 |
| | | | | 709/226 |
| 2012/0117208 | A1* | 5/2012 | Shaffer | H04L 29/12254 |
| | | | | 709/221 |

OTHER PUBLICATIONS

"IP Network Address Translator (NAT) Terminology and Considerations," P. Srisuresh, Network Working Group, Request for Comments: RFC 2663, The Internet Society, Aug. 1999, pp. 1-30.

* cited by examiner

SYSTEM AND METHOD FOR OPTIMIZING MANAGEMENT CONTROLLER ACCESS FOR MULTI-SERVER MANAGEMENT

FIELD OF THE DISCLOSURE

The present disclosure generally relates to information handling systems, and more particularly relates to optimizing management controller access for multi-server management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

A private network can include multiple information handling systems that can be accessed by devices outside of the private network. An external device can utilize an Internet Protocol (IP) address to establish communication with one of the information handling system, and that IP address can be utilized to route the communication signal to the proper information handling system upon the communication signal entering the private network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
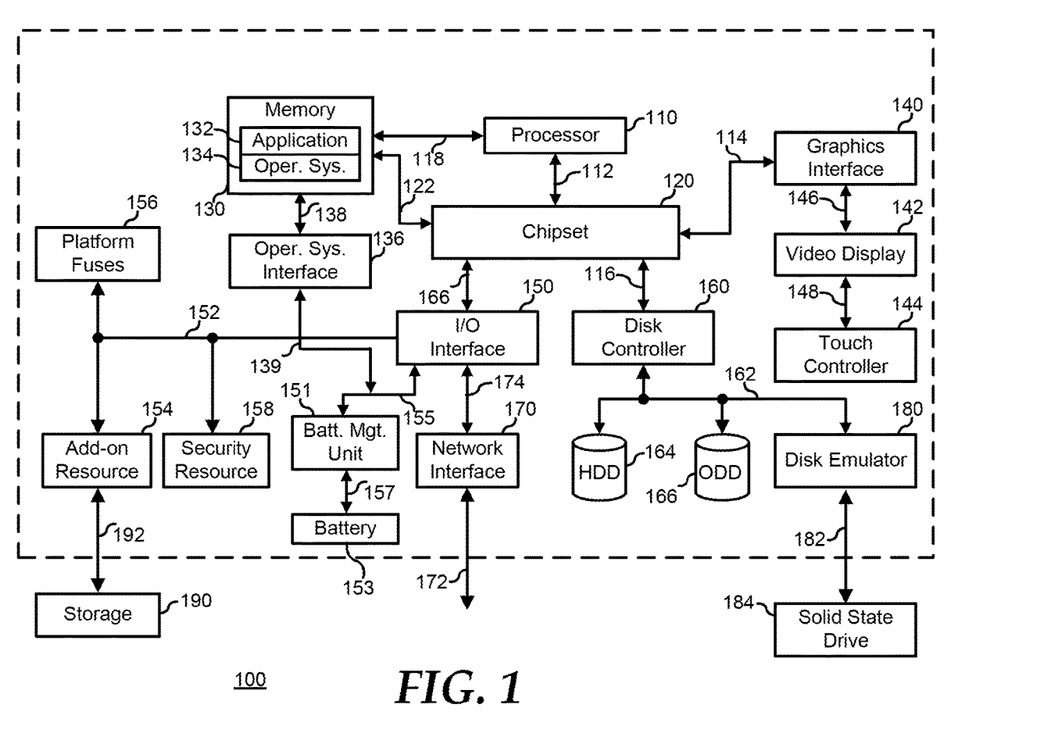
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 110 via a graphics interface 114, and provides a video display output 146 to a video display 142. Video display 142 is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 is connected to chipset 120 via connection 166. I/O interface 150 includes a peripheral interface 152 that connects the I/O interface to an add-on resource 154, to platform fuses 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Figure 2:
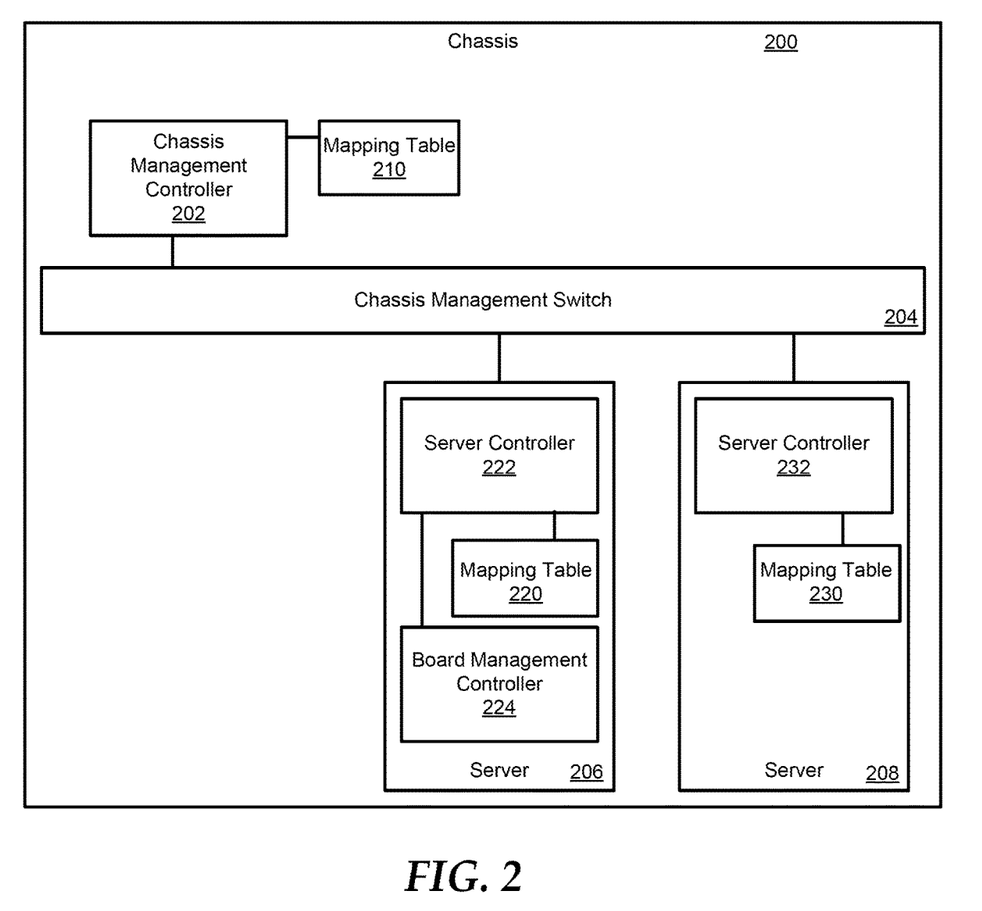
FIG. 2 is a block diagram illustrating a chassis including multiple servers according to an embodiment of the present disclosure.

FIG. 2 shows a block diagram of an information handling system or chassis 200 including multiple other information handling systems or servers 206 and 208 according to an embodiment of the present disclosure. The chassis 200 may include a chassis management controller 202 and a chassis management switch 204, which in turn can be utilized to enable communication between the chassis management controller 202 and the servers 206 and 208. The chassis management controller 202 may include a mapping table 210. In an embodiment, the mapping table 210 may be stored in a memory internal to the chassis management controller 202, such as HDD 164 of FIG. 1, may be stored in a memory external to the chassis management controller, or the like.

The server 206 may include a server controller 222, a mapping table 220, and a board management controller 224. In an embodiment, the mapping table 220 may be stored in a memory internal to the server controller 222, such as HDD 164 of FIG. 1, may be stored in a memory external to the server controller, or the like. The server 208 may include a server controller 232 and a mapping table 230. In an embodiment, the mapping table 230 may be stored in a memory internal to the server controller 232, such as HDD 164 of FIG. 1, may be stored in a memory external to the server controller, or the like.

In an embodiment, the components within the chassis 200, such as the chassis management controller 202 and the servers 206 and 208 can communicate with each other to form a private network. In this embodiment, an information handling system outside of the private network can utilize a single Internet Protocol (IP) address to communicate with any of the controllers 202, 222, and 232. In an embodiment, the controllers 202, 222, and 232 can be addressed in the form of <IP address>:<port number>, where the port number is defined and generated by the chassis management controller 202 for each of the controllers based on a slot number or server number associated with the server or port of the chassis management switch 204 within the private network that the controller is connected. For example, the address for server controller 222 can be 10.35.104.71:8000 and the address for server controller 232 can be 10.35.104.71:8010, as will be discussed below. Upon receiving an incoming service request or an establishment of a session from an external information handling system to the private network, the chassis management controller 202 can utilize the mapping table 210 to determine which of the controller 222, 232, or 224 to forward the request or establishment of the session to based on the port number of the address.

In an embodiment, user defined two-byte port numbers 1024 to 65,536 can be utilized in the addressing of the controllers 222 and 232. In an embodiment the port numbers 0-1023 can be reserved, such that port numbers 1024-65,536 can be utilized in addressing the controllers 222 and 232. The addressing of the controllers 222 and 232 can be considered a Server Management as Service (SMaS), because each controller, such as chassis management controller 202, can be viewed as service from the top-level perspective. In an embodiment, a configurable numbering convention can be used to assign the port numbers to the controllers 222, 232, and 224, and the numbering convention can be configurable by an individual that interfaces with the chassis management controller 202.

During operation, the chassis management controller 202 can create the mapping table 210 as the servers 206 and 208 are connected to the chassis management switch 204. The chassis management controller 202 can generate a port number for the each of the controllers 222 and 232. In an embodiment, the chassis management controller 202 can generate a port number using the equation 1 below:

Port Number=default number+(port number designator*1000)+child number     (EQ. 1)

The default number can be configurable to be any value set by an individual, such as 8000. In an embodiment, a value of the port number designator can be set based on a service to be provided by the server. For example, if the server 206 is configured to be a web service node, the server 206 can be operatively coupled to port 80 on the chassis management switch 204, and the port number designator can be 0. In another embodiment, the server 206 can be an SSH server. In this embodiment, the server 206 can be operatively coupled to port 22 on the chassis management switch 204, and the port number designator can be set to 1. The child number can be set to different values based on the whether the controller is a child or grandchild node of the chassis management controller 202. For example, if the controller 222 is configured as the first child of the chassis management controller 202, the child number for controller 222 can be set to zero. In an embodiment, the child number can platform dependent, such that the increase in the child number from one child node to the next can be set based on the topology of the system. In an embodiment, the value for the child number of a next in order child node can be increased by a predetermined amount so that enough port numbers are available between one child node and the next child node so that if a child node has an child node of its own, the port number for the grandchild node can fall in between the port numbers of the two other child nodes. For example, the controller 232 can be configured as the second child of the chassis management controller 202, and the child number for controller 232 can be set to 10. The increase in the child number can be configured to be any value set by a user.

Using the exemplary values stated above, when the chassis management controller detects the presence of controller 222, the chassis management controller can generate a port number for the controller of server 206. For example, if the server 206 is connected to port 80 of the chassis management switch 204, such that the server can be configured to provide web services, the default number for controller 222 can be 8000, the port number designator can be 0, and the child number value can be 0 based on the controller being the first child node of the chassis management controller. Thus, using equation 1 above the port number for controller 222 in mapping table 210 can be 8000.

In an embodiment, the server 208 can be connected to port 80 of the chassis management switch 204, such that the server can be configured to provide web services, and the controller 232 can be configured as the second child node of the chassis management controller 202. In this embodiment, the default number for controller 232 can be 8000, the port number designator can be 0, and the child number value can be 10 based on the controller being the second child node of the chassis management controller. Thus, using equation 1 above the port number for controller 222 in the mapping table 210 can be 8010. The chassis management controller 202 can then store the port number, the translated port, and the IP address of each of the controllers 222 and 232 in the mapping table 210 as shown in Table 1 below:

TABLE 1

Mapping Table

| Controller | Child Number | Grandchild Number | Port Number | Translated Port | Child IP |
|---|---|---|---|---|---|
| 222 | 1 | | 8000 | 80 | 10.35.104.72 |
| 232 | 2 | | 8010 | 80 | 10.35.104.51 |

In an embodiment, the translated port listed for a controller in the mapping table 210 is the port of the chassis management switch 204 that the controller is operatively coupled. The IP address can be the internal IP address assigned to the controller within the private network. However, an external device can utilize only the port number when establishing a connection with a particular controller within the private network of chassis 200. For example, the entire private network of chassis management controller 202 can be assigned an IP address of 10.35.104.71, such that communications designated for controller 222 can have 10.35.104.71:8000 as the address, based on the IP address of the chassis private network and the port number of the controller. In this embodiment, the chassis management controller 202 can receive a communication with this address and can extract the port number from the address, such as 8000. The chassis management controller 202 can then utilize the mapping table 210 to determine that controller 222 is associated with port number 8000. The chassis management controller 202 can also retrieve the translated port and IP address for controller 222, such as port 80 and 10.35.104.72, from the mapping table 210 and forward the communication to the controller based on the translated port and internal IP address.

In an embodiment, the use of the single IP address for the chassis management controller 202 and the separate port numbers of the controllers 222 and 232 within the chassis enables external device to only track the IP address of the chassis management controller 202. In this embodiment, if the chassis management controller 202 moves to a different network, then at most one IP address change needs to be tracked, such as the IP address of the chassis management controller 202.

In an embodiment, the servers 206 and 208 can be utilized as both a web service and as SSH servers. In this embodiment, the servers 206 and 208 can each have two port number entries in the mapping table 210 as shown in Table 2 below:

TABLE 2

Mapping Table

| Controller | Child Number | Grandchild Number | Port Number | Translated Port | Child IP |
|---|---|---|---|---|---|
| 222 | 1 | | 8000 | 80 | 10.35.104.72 |
| 232 | 2 | | 8010 | 80 | 10.35.104.51 |
| 222 | 1 | | 9000 | 22 | 10.35.104.72 |
| 232 | 2 | | 9010 | 22 | 10.35.104.51 |

In this embodiment, the port numbers can be calculated using the default number, the port number designator, and the child number value for the controllers 222 and 232 as described above. Thus, an external device could request a service from controller 232 using two different IP address, such as 10.35.104.71:8010 and 10.35.104.71:9010. In this embodiment, both requests will be forwarded to controller 232 based on the port numbers 8010 and 9010 both being assigned to the controller in mapping table 210.

In an embodiment, a child node, such as controller 222 of server 206, can be adopted by a parent node, such as chassis management controller 202, and the child node itself can have one or more child nodes. For example, controller 222 can have a child node within server 206, such as the board management controller 224. In this example, the controller 222 can have a mapping table 220 that can be utilized to determine whether a communication is designated for the board management controller 224. In an embodiment, the controller 222 can generate a port number for board management controller 224 in substantially the same manner as described above, such as using a default number, a port number designator, and a child number value. In this example, the default number can still be 8000, the port number designator can be 0, and the child number can be 1. Thus, using equation 1 above, the controller 222 can assign a port number of 8001 to the board management controller 224 in the mapping table 220. When controller 222 is adopted by, or connected to, chassis management controller 202, the chassis management controller can generate a port number for the controller 222 and can also determine that the controller has a child node.

The chassis management controller 202 can then request the information in the mapping table 220 from the controller 222. In response to the request, the controller 222 can return the information associated with the board management controller 224, such as port number, translated port, and IP address. The chassis management controller 202 can then determine whether the port number of the board management controller 224 causes a conflict within the mapping table 210, such as another controller or child node is already assigned the same port number. If no conflict is detected, the chassis management controller 202 can merge the information from mapping table 220 into mapping table 210 to create an updated mapping table with child and grandchild nodes of the chassis management controller as shown in Table 3 below:

TABLE 3

Mapping Table

| Controller | Child Number | Grandchild Number | Destination Port | Translated Port | Child IP |
|---|---|---|---|---|---|
| 222 | 1 | | 8000 | 80 | 10.35.104.72 |
| 224 | 1 | 1 | 8001 | 80 | 10.35.104.73 |
| 232 | 2 | | 8010 | 80 | 10.35.104.51 |

However, if a conflict arises, the chassis management controller 202 can resolve the conflict by changing one of the port numbers and then merging the mapping tables together in mapping table 210. In this situation, the chassis management controller 202 can notify controller 222 of the changes to the port number of the board management controller 224, such that controller 222 can update mapping table 220.

The above description has been with respect to the chassis management controller 202 including the mapping table 210. However, in an embodiment a switch or router, such as the chassis management switch 204 can include the mapping table 210. In this embodiment, the chassis management switch 204 can redirect an initially established connection to the designated controller 222, 224, or 232 or endpoint based on the mapping table with changing the scope of the disclosure.

In an embodiment, the IP address of one or more of the controllers 222, 224, and 232 can be changed. For example, the IP address may change based on an IP configuration change, a firmware update, a firmware update at the child node, a dynamic host configuration protocol (DHCP) lease release or renewal, that the network interface card (NIC) of the child node changes between a dedicated NIC to a shared local area network on motherboard (LOM), or the like. In this embodiment, the child node, such as controller 222, can notify the parent node, chassis management controller 202, of the change in IP address so that the change can be made in the mapping table 210. In an embodiment, a child node can be adopted by, or connected to, multiple parent nodes as shown in FIG. 3.

Figure 3:
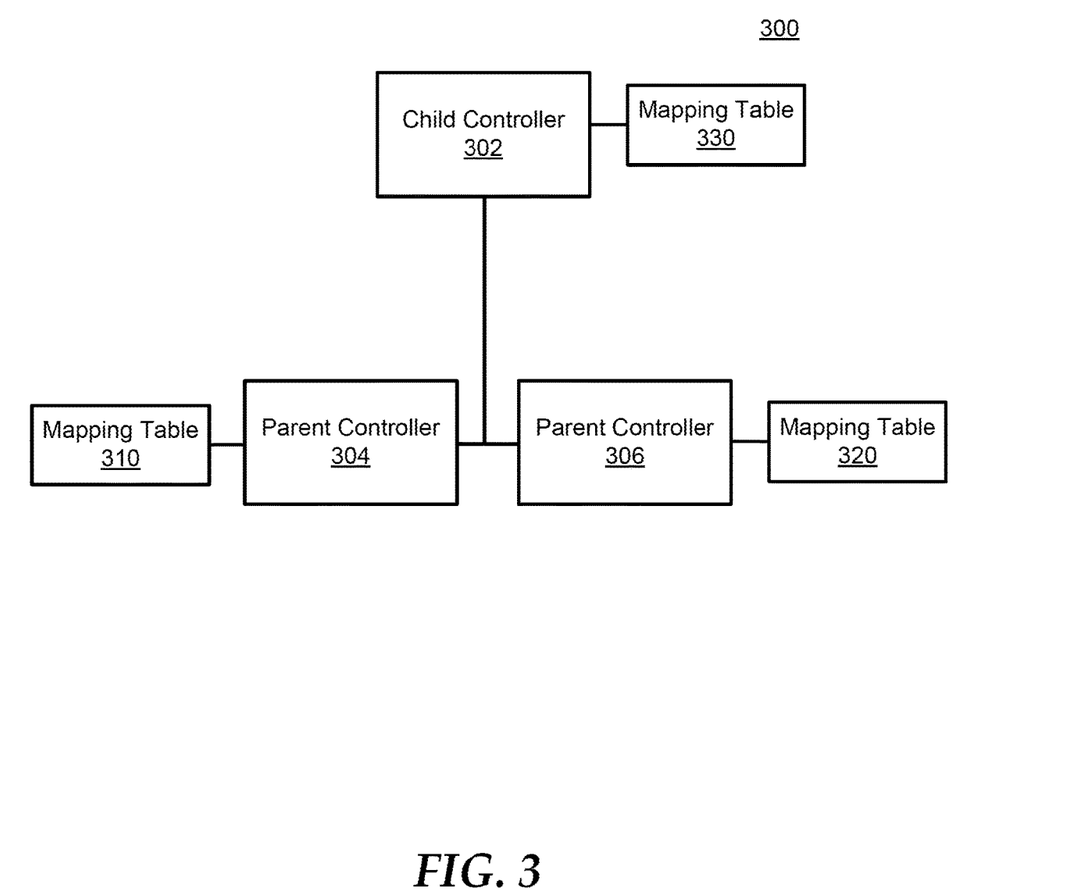
FIG. 3 is a block diagram illustrating a child node connected to multiple parent nodes according to an embodiment of the present disclosure.

FIG. 3 shows a private network 300 including a child node or controller 302 operatively coupled to parent nodes 304 and 306 according to an embodiment of the present disclosure. The parent controller 304 can include a mapping table 310, the parent controller 306 can include a mapping table 320, and the child node 302 can include a mapping table 330. In this embodiment, the child controller 302 can be listed in each of the mapping tables 310 and 320, which in turn can include the port number, translated port, and IP address for the child controller 302 as described above with respect to FIG. 2. The child controller 302 can then have its IP address, within private network 300, changed based on an IP configuration change, a firmware update, a firmware update at the child node, a DHCP lease release or renewal, that NIC of the child controller has been changed between a dedicated NIC to a shared LOM, or the like.

The child controller 302 can provide a broadcast signal indicating that the parent controllers 304 and 306 need to update their respective mapping tables 310 and 320 because the IP address of the child controller has changed. In an embodiment, the broadcast signal can also include the new IP address of the child controller 302. The parent controllers 304 and 306 can receive the broadcast signal, retrieve the new IP address for the child controller 302 from the signal and then update their respective mapping tables 310 and 320 by replacing the old IP address of the child controller with the new IP address.

In this embodiment, the child controller 302 can also have a child node itself, which can be a grandchild controller of the parent controllers 304 and 306, listed in the mapping table 330, which in turn can include the port number, translated port, and IP address for the child controller of the child controller 302 as described above with respect to FIG. 2. The child controller within the mapping table 330 can then have its IP address, within private network 300, changed based on an IP configuration change, a firmware update, a firmware update at the child node, a DHCP lease release or renewal, that NIC of the child controller has been changed between a dedicated NIC to a shared LOM, or the like.

The child controller 302 can update the IP address within the mapping table 330, and can then provide a broadcast signal indicating that the parent controllers 304 and 306 need to update their respective mapping tables 310 and 320 because the IP address of the grandchild controller has changed. In an embodiment, the broadcast signal can also include the new IP address of the grandchild controller. The parent controllers 304 and 306 can receive the broadcast signal, retrieve the new IP address for the grandchild controller from the signal and then update their respective mapping tables 310 and 320 by replacing the old IP address of the grandchild controller with the new IP address.

Figure 4:
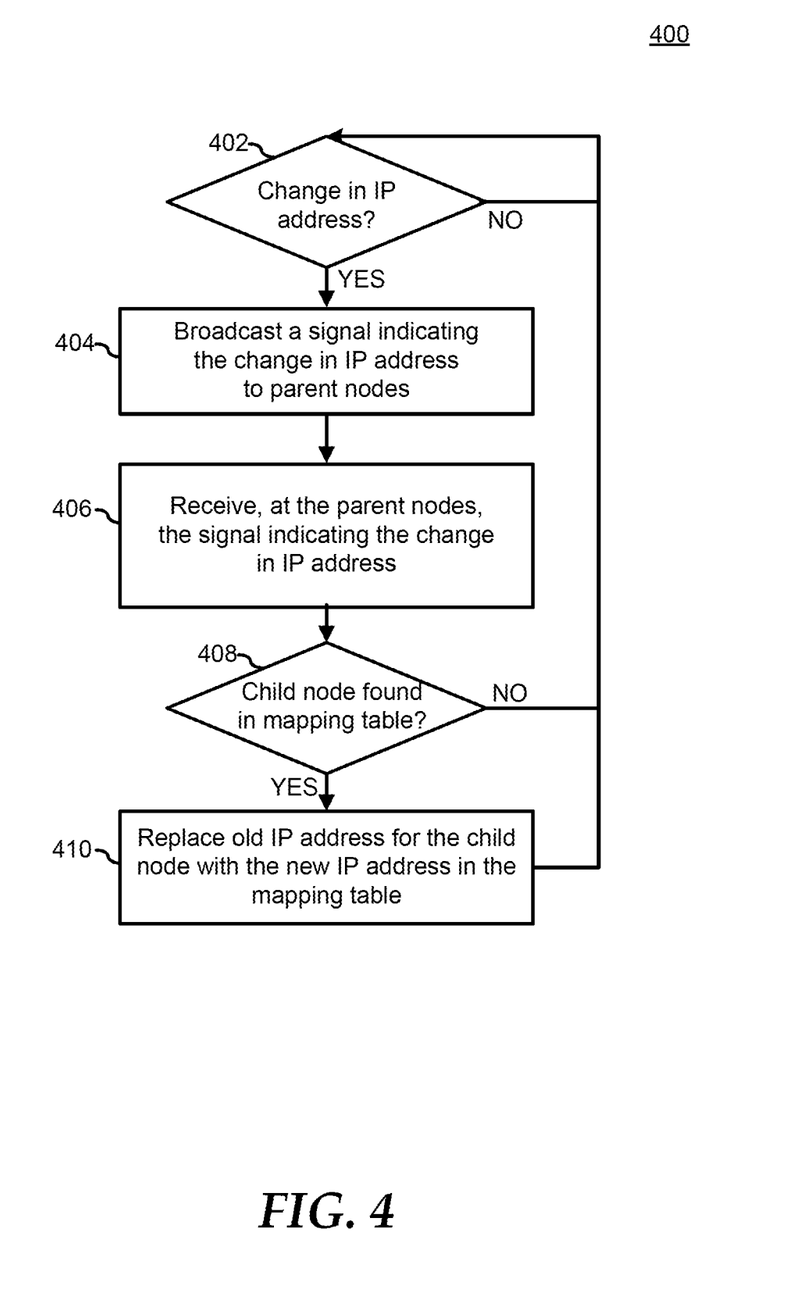
FIG. 4 is a flow diagram illustrating a method for populating changes in a child node to multiple parent node mapping tables according to an embodiment of the present disclosure.

FIG. 4 shows a flow diagram of a method 400 for populating changes in a child node to multiple parent node mapping tables according to an embodiment of the present disclosure. At block 402, an IP address of a child node is changed. In an embodiment, the IP address may be changed for a variety of reasons, such as an IP configuration change, a firmware update at the child node, a DHCP lease release or renewal, that the NIC of the child node changes between a dedicated NIC to a shared LOM, or the like. In an embodiment, the child node can be a controller for a server, a controller for a chassis, or the like. A signal indicating the IP change of the child node can be broadcasted by the child node to the parent nodes at block 404. In an embodiment, the signal can notify the parent nodes that an update to the parent node mapping table is required because the IP address of the child node has changed, and can also include the new IP address of the child node. In an embodiment, the signal can include an identifier of the child node.

At block 406, the signal indicating the change in the IP address for the child node can be received at each parent node in communication with the child node. At block 408, a determination is made whether an identifier of the child node in located in the mapping table of the parent node. If the identifier is not found in the mapping table of the parent node, no action is taken by the parent node and the flow continues as described above at block 402. If the identifier is found, the flow continues at block 410 and the old IP address for the child node is replaced in the mapping table with the new IP address provided in the broadcasted signal.

Figure 5:
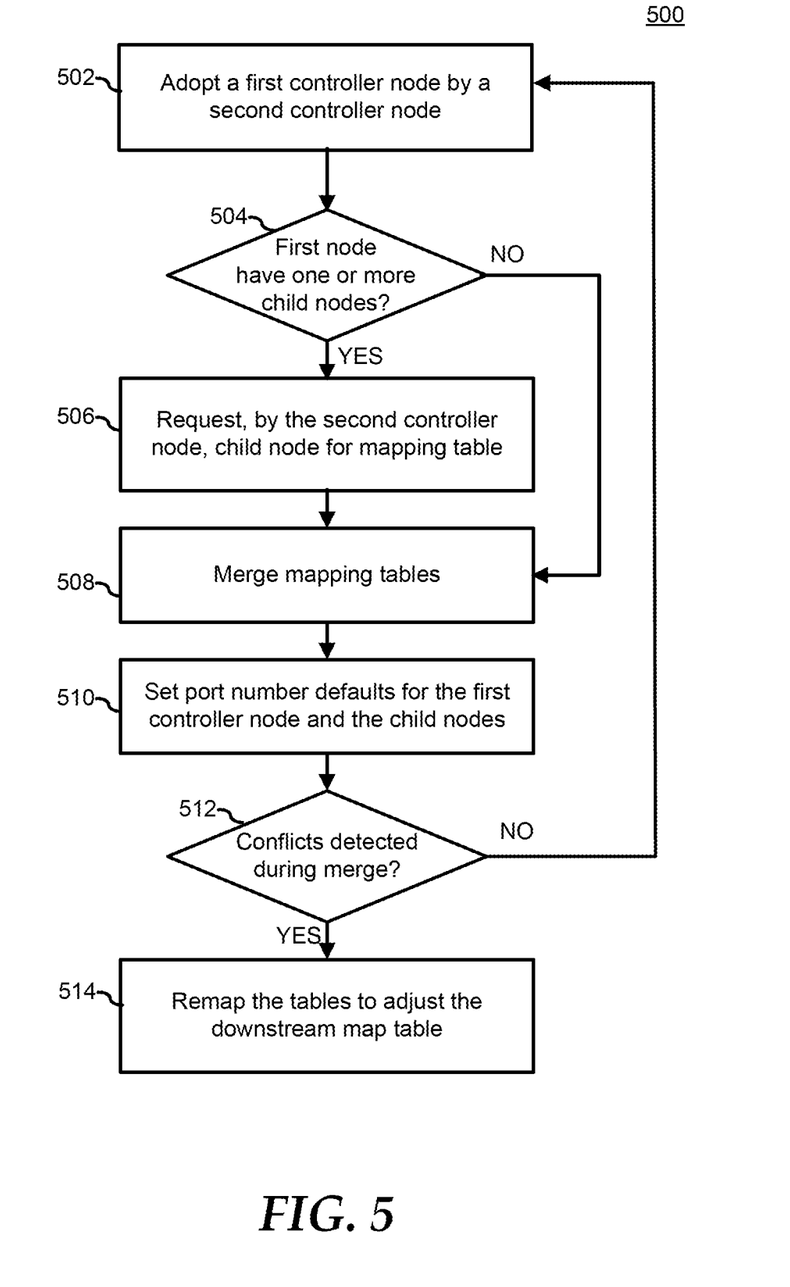
FIG. 5 is a flow diagram illustrating a method for remapping tables in response to a multi-level node adoption according to an embodiment of the present disclosure.

FIG. 5 is a flow diagram illustrating a method of remapping tables in response to a multi-level node adoption according to an embodiment of the present disclosure. At block 502, a first controller node is adopted by a second controller node. In an embodiment, the first controller node can be a parent node, such that the first controller node can have child and grandchild nodes. At block 504, a determination is made whether the first controller node has one or more child nodes. If the first controller node does not have one or more child nodes, the flow continues at block 508. If the first controller node does have one or more child nodes, the flow continues at block 506 and a request for information associated with the child node is requested by the second controller node.

At block 508, the mapping tables of the controllers are merged. In an embodiment, the merged table can result from the mapping tables of the first controller, the mapping table of the second controller, and the mapping table of the child node being combined or merged together. Port number defaults are set for the first controller node and the child nodes, if any, at block 510. At block 512, a determination is made whether a conflict is detected during the merger of the mapping tables. In an embodiment, a conflict can be detected if a port number of the mapping table in the child node is the same as a port number in the mapping table of the parent node. If a conflict is not detected the flow continues as stated above at block 502. If a conflict is detected, the tables are remapped to change one or more port numbers, and the parent node notifies the child nodes on the remapping so that the downstream mapping tables can be adjusted accordingly.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components.

Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:

detecting, at a first controller, a presence of a second controller of a first node in response to the first node being connected to a private network, wherein the first controller and the second controller are in a chassis;

generating, by the first controller, a port number for the second controller based on a pre-defined default number, on a port number designator that is set based on of service to be provided by the first node, and on a child number of the second controller, wherein the child number is a first number if the second controller is a child of the first controller or a second number if the second controller is a grandchild of the first controller, and wherein a value of the first number is less than or equal to a value of the second number, wherein the port number is calculated using an equation:

Port Number=default number+(port number designator*1000)+child number;

storing the port number for the second controller in a mapping table of the first controller, wherein the mapping table includes the port number, a translated port that is a particular port number of a chassis management switch within the private network to which the second controller is coupled, and an internal Internet Protocol address of the second controller;

receiving an indication that the internal Internet Protocol address of the second controller has changed;

updating the mapping table with the changed internal Internet Protocol address of the second controller;

receiving a service request from an external information handling system to the private network, wherein the service request includes an Internet Protocol address and the port number;

determining which controller to forward the service request based on the port number in the updated mapping table; and forwarding the service request to the determined controller.

2. The method of claim 1, wherein the port number designator is zero for a first type of node and numbered incrementally for a number of available services of nodes.

3. The method of claim 1, wherein the first controller is one of a plurality of parent nodes, wherein the second controller is the child of the first controller, wherein a third controller is another of the parent nodes, and wherein the second controller is adopted by the third controller.

4. The method of claim 1, further comprising:

checking that the second controller is located in the mapping table prior to updating the mapping table with the changed internal Internet Protocol address of the second controller, wherein the indication that the internal Internet Protocol address of the second controller has changed is a broadcast signal received from the second controller.

5. The method of claim 1, further comprising:

extracting the port number from the changed internal Internet Protocol address in the updated mapping table.

6. The method of claim 1, wherein the mapping table is stored in a memory internal to a chassis management controller.

7. The method of claim 1, wherein the change in the internal Internet Protocol address is based on one of a configuration change, a firmware update change, or a dynamic host configuration protocol change.

8. The method of claim 4, wherein the broadcast signal includes changed Internet Protocol address of the second controller.

9. The method of claim 1, further comprising determining whether the mapping table includes an identifier of the second controller prior to the updating the mapping table with the changed internal Internet Protocol address of the second controller.

10. An information handling system comprising:

a memory to store a mapping table, wherein the mapping table includes a port number, a translated port that is a particular port number of a chassis management switch within a private network to which a second controller is coupled, and an Internet Protocol address of the second controller; and a first controller configured to communicate with the memory, the first controller to detect a presence of the second controller of a first node in response to the first node being connected to the private network within the information handling system, to generate the port number for the second controller based on a pre-defined default number, on a port number designator that is set based on of service to be provided by the first node, and on a child number of the second controller, wherein the child number is a first number if the second controller is a child of the first controller or a second number if the second controller is a grandchild of the first controller, wherein the port number is calculated using an equation:

Port Number=default number+(port number designator*1000)+child number, to store the port number for the second controller in the mapping table, to receive an indication that the Internet Protocol address of the second controller has changed, and to update the mapping table with the changed Internet Protocol address of the second controller, wherein a value of the first number is less than or equal to a value of the second number; to receive a service request from an external information handling system to the private network to access the second controller; and to forward the service request to the second controller based on the port number.

11. The information handling system of claim 10, wherein the port number designator is zero for a first type of node and numbered incrementally for a number of available services of nodes.

12. The information handling system of claim 10, wherein the indication that the Internet Protocol address of the second controller has changed is a broadcast signal received from the second controller.

13. The information handling system of claim 10, wherein the first controller to check that the second controller is located in the mapping table prior to updating the mapping table with the changed Internet Protocol address of the second controller.

14. The information handling system of claim 10, wherein the port number is extracted from the changed Internet Protocol address.

15. A method comprising:
    detecting, at a first controller, a presence of a second controller of a first node in response to the first node being connected to a private network, wherein the first controller and the second controller are in a chassis;
    generating, at the first controller, a first port number for the second controller based on a pre-defined default number, a port number designator that is set based on of service to be provided by the first node, and a child number of the second controller, wherein the child number is a first number if the second controller is a child of the first controller or a second number if the second controller is a grandchild of the first controller, and wherein a value of the first number is less than or equal to a value of the second number, wherein the first port number of the second controller is calculated using an equation Port Number=default number+(port number designator*1000)+child number;

storing the first port number for the second controller in a first mapping table of the first controller, wherein the first mapping table includes the first port number, a translated port that is a first particular port number of a chassis management switch within the private network to which the second controller is coupled, and a first internal Internet Protocol address of the second controller;

detecting that the second controller includes a second mapping table, wherein a second port number for a third controller is located in the second mapping table, wherein the second mapping table includes the second port number, a second translated port that is a second particular port number of the chassis management switch within the private network to which the third controller is coupled, and a second internal Internet Protocol address of the third controller; and merging the second mapping table within the first mapping table to create a merged mapping table;

receiving, at the first controller, a request to access the second controller; and forwarding the request to the second controller based on a port number located in an address of the request.

16. The method of claim 15, further comprising:
requesting, by the first controller, the second mapping table from the second controller prior to merging the second mapping table within the first mapping table; and
receiving the second mapping table from the second controller prior to merging the second mapping table within the first mapping table.

17. The method of claim 15, further comprising:
providing, by the first controller the merge mapping table to the second controller, and to the third controller via the second controller.

18. The method of claim 17, further comprising:
determining, by the first controller, that the second mapping table does not conflict with the first mapping table prior to merging the second mapping table within the first mapping table.

19. The method of claim 15, further comprising:
receiving an indication that the first internal Internet Protocol address of the second controller has changed; and
updating the first mapping table with the changed first internal Internet Protocol address of the second controller.

20. The method of claim 15, wherein the second controller is a child node of the first controller, and the third controller is a grandchild node of the first controller.

* * * * *